US007069452B1

(12) United States Patent
Hind et al.

(10) Patent No.: US 7,069,452 B1
(45) Date of Patent: Jun. 27, 2006

(54) METHODS, SYSTEMS AND COMPUTER PROGRAM PRODUCTS FOR SECURE FIRMWARE UPDATES

(75) Inventors: John R. Hind, Raleigh, NC (US); Marcia Lambert Peters, Durham, NC (US)

(73) Assignee: International Business Machines Corporation, Armonk, NY (US)

( * ) Notice: Subject to any disclaimer, the term of this patent is extended or adjusted under 35 U.S.C. 154(b) by 1207 days.

(21) Appl. No.: 09/614,982

(22) Filed: Jul. 12, 2000

(51) Int. Cl.
*G06F 17/00* (2006.01)

(52) U.S. Cl. ................. 713/200; 713/189; 713/1; 713/2

(58) Field of Classification Search ........... 703/200; 713/1–2, 200–202, 189–194
See application file for complete search history.

(56) References Cited

U.S. PATENT DOCUMENTS

| | | | | |
|---|---|---|---|---|
| 5,022,077 A | * | 6/1991 | Bealkowski et al. | 711/163 |
| 5,293,424 A | * | 3/1994 | Holtey et al. | 713/193 |
| 5,579,522 A | * | 11/1996 | Christeson et al. | 713/2 |
| 5,844,986 A | * | 12/1998 | Davis | 713/187 |

OTHER PUBLICATIONS

"Introduction to Digtial Signal Processors", Jun. 15, 1999, [Retrieved from the Internet Apr. 29, 2004], "http://www.ece.utexas.edu/~bevans/hp-dsp-seminar/01__introduction/".*
ANSI Standard X9.31. Digital Signatures Using Reversible Public Key Cryptography for the Financial Services Industry (rDSA), 1998.
Schneier, Bruce, *Applied Cryptography*, Dec. 1995, pp. 435-441 and 466-474.

* cited by examiner

*Primary Examiner*—David Jung
(74) *Attorney, Agent, or Firm*—Myers Bigel Sibley & Sajovec

(57) ABSTRACT

Methods, systems and computer program products which provide secure updates of firmware (i.e. data stored in a programmable memory device of a processing system) are disclosed. Updates of a programmable memory of a device may be controlled by providing an update window of finite duration during which the programmable memory may be updated. Access to the programmable memory may be based on the state of an access latch. The access latch may be set to allow access after a hardware reset of the device. An update control program may be executed to control access to the programmable memory and the latch reset to prevent access upon completion of the update control program. Verification of the update may be provided through encryption techniques and rules incorporated in certificates for application of updates to provide for selectively updating devices. Also disclosed are methods of securely providing differing functionality to generic devices.

36 Claims, 12 Drawing Sheets

METHODS, SYSTEMS AND COMPUTER PROGRAM PRODUCTS FOR SECURE FIRMWARE UPDATES

RELATED APPLICATIONS

The present application is related to commonly assigned and concurrently filed U.S. patent application Ser. No. 09/614,983, entitled "METHODS, SYSTEMS AND COMPUTER PROGRAM PRODUCTS FOR RULE BASED FIRMWARE UPDATES UTILIZING CERTIFICATE EXTENSIONS", the disclosure of which is incorporated by reference as if set forth fully herein.

FIELD OF THE INVENTION

The present invention relates to data processing systems and more particularly to data processing systems having programmable memories.

BACKGROUND OF THE INVENTION

Many devices today make use of computational elements controlled by software instructions embedded in the device to give the device its functional personality. This software, often called firmware because of its persistent association with the device hardware operation, was historically placed in read-only memory (ROM) and was activated when the device was powered on. With time, it was recognized that firmware, like other forms of software, might be subject to coding mistakes and that over the lifetime of the device there was a need to modify the functional characteristics of the device, for example, to adapt it to a new target environment. This need to repair firmware coding errors and/or modify firmware functionality led to the use of field-programmable random-access memory (RAM) as a repository for on-device firmware. This provided an easier means of modification than replacing ROM chips.

As a result of this evolution, typically, firmware can be updated without physical hardware modification, using removable digital media or a network connection as the mechanism by which new firmware is communicated to the device. The extensive increase in network connectivity in recent years has resulted in an increase in the number of firmware-driven devices that allow personality updates. With the increasing number of update capable devices may come significant security problems. With the ubiquitous nature of firmware-driven devices, such security problems may extend to homes, businesses and other areas where such devices are utilized. For example, personal computers, pagers, cell phones, satellite receivers, set-top boxes, cable and DSL modems, routers, digital TVs, or even appliances like refrigerators, sewing machines, and ovens may all be susceptible to such security problems.

In a personal computer, firmware instructions are generally referred to as a Basic Input-Output System (BIOS). A BIOS typically contains hardware diagnostics, code which initializes and enables/disables certain hardware features (for example boot from network, system board sound or display capability, memory parity, I/O bus speed, DMA, etc.), and instructions enabling the operating system and application programs to interface with the computer hardware. Parameters governing branches through the initialization code to enable/disable or configure certain hardware features are often stored in battery-backed-up CMOS RAM. All of these instructions, typically, must be executed or instantiated as an application program interface (API) successfully in order for the computer to boot.

It is well known in the art that the hardware in which the firmware (e.g., PC BIOS) instructions reside may be a field-programmable ROM such as an EE-PROM or a Flash RAM. Such hardware designs are desirable in allowing the manufacturer to update the firmware after manufacture, for example, to enable new capabilities or fix problems. However, storing the BIOS in a flash memory may also open new vulnerabilities that can be exploited by hackers. For example, some of the approximately 50,000 computer viruses known today—such as the Chernobyl virus (known as CIH and W95.CIH)—overwrite the BIOS with invalid instructions, completely disabling the computer and requiring physical replacement of the BIOS chip.

However, security problems may extend beyond the malicious third parties attempting to damage devices in customers' hands. It is well known that many devices are built on generic hardware, where the sole difference between several models may be the sticker on the front panel, the firmware load in the resident flash, and the price. In such devices, a customer may, for example, change an inexpensive device into a more expensive device merely by updating the firmware. For example, a manufacturer of Compact Disk Read Write (CDRW) drive mechanisms recently began to receive service calls about its named brand $300 6x-write-speed drives which turned out to be $100 OEM 4x-write-speed drives with their named brand firmware update installed. Accordingly, manufacturers of devices that use easily updateable firmware may be faced with significant security problems that are complicated by situations where the device executes non-firmware application code, and/or the device owner is complicit in the hacking activity.

SUMMARY OF THE INVENTION

Embodiments of the present invention include methods, systems, computer program products and business methods which provide secure updates of firmware (i.e. data stored in a programmable memory device of a processing system). Such secure updates may be provided by controlling updates of a programmable memory of a device by providing an update window of finite duration during which the programmable memory may be updated and allowing updates of the programmable memory only during the update window. Furthermore, the update window may be provided by allowing access to the programmable memory based on the state of an access latch. The access latch may be set to allow access to the programmable memory after a hardware reset of the device. An update control program, which may reside in Read Only Memory, may be executed to control access to the programmable memory and the latch reset to prevent access to the programmable memory upon completion of the update control program.

In further embodiments of the present invention, access to a memory where the update control program resides may be allowed when the access latch allows access to the programmable memory and prevented when the access latch prevents access to the programmable memory. Furthermore, it may be determined if an update of the programmable memory is available and, if so, the programmable memory may be updated. Such a determination of the availability of an update may be made by examining at least one of a local memory location, a local drive, a network drive and an input device status to determine if an update is available or by examining persistent status information.

The programmable memory may be updated by obtaining an update image containing update data to be written to the programmable memory, obtaining installation information from the update image and writing the update data to the programmable memory based on the installation information obtained from the update image. In particular embodiments of the present invention, the installation information may be an install program and the install program executed to write the update data to the programmable memory.

In still further embodiments of the present invention, the programmable memory may be updated by loading an update image into a temporary workspace and updating the programmable memory from the loaded update image. Furthermore, existing data from the programmable memory may be stored so as to provide a backup copy of the data of the programmable memory. In such embodiments, it may be determined if the update of the programmable memory was successful and the contents of the programmable memory restored from the backup copy if the update of the programmable memory was not successful.

In yet additional embodiments of the present invention, the update control program may verify the authenticity of the update of the programmable memory. Such verification can be accomplished in various ways, for example by means of a shared secret, or by a public-key cryptosystem, or in other ways known to those with skill in the art. In certain embodiments, verification of the image may be accomplished by including and checking a digital signature comprising a hash of the image encrypted by the private key of an update authority. In addition to the signature, an X.509 certificate of the update authority may also be included with the distribution of the image. See CCITT Recommendation X.509, "The Directory-Authentication Framework", Consultation Committee, International Telephone and Telegraph, International Telecommunications Union, Geneva, 1989. The verification of the signature may be provided by computing the hash over the image, decrypting the signature using the public key from the included certificate, and comparing the decrypted result with the computed hash value. If they are equal, the signature verification has succeeded. The control program then validates the update authority's certificate by validating a signature contained therein, the signature having been created by the certificate authority signing the update authority's certificate using the certificate authority's private key. In a non-chained form, this validation may be provided by using a public key of the certificate authority that issued the update authority's certificate to decrypt the digital signature contained in the update authority's certificate and comparing it against a computed hash of the update authority's certificate. The certificate authority's public key used to perform this validation may be contained in the ROM image or in the current contents of the protected memory. In a more complex arrangement, the image would contain a chain of certificates that can be validated back to a certificate signed by the root certificate authority.

In still further embodiments of the present invention, the update may include a plurality of certificates in a hierarchy of certificates. In such embodiments, the verification of authenticity may be accomplished by evaluating each of the plurality of certificates in the update image to determine if a valid digital signature is provided with each certificate of the update image. Such an evaluation may be accomplished by decrypting a digital signature of a certificate utilizing a public key associated with the certificate and comparing the decrypted digital signature with a predefined value to determine if the digital signature is a valid digital signature associated with the certificate. A public key associated with another of the digital certificates may be obtained and the decryption and comparison repeated utilizing the obtained public key associated with another of the digital certificates. This process may be repeated until a public key associated with a last of the digital certificates is obtained and the signature of the last digital certificate decrypted and compared.

In additional embodiments of the present invention, application rules information may be obtained from an extension of at least one certificate associated with the update. The rules information obtained from a certificate may be evaluated and the programmable memory selectively updated based on the evaluation of the rules information obtained from the certificate. In particular, the rules information may be rules information associated with a manufacturer of the device, rules information associated with a brand of the device, rules information associated with a software version of the device, rules information associated with a license authorization of the device or rules associated with the individual device.

In still further embodiments of the present invention, a system for controlling access to a programmable memory of a device may be provided. The system may include a latch and a memory controller configured to control read and write operations to the programmable memory and operably associated with the latch so as to allow write operations to the programmable memory when the latch is in a first state and to prevent write operations to the programmable memory when the latch is in a second state. A latch enable circuit may be configured to set the latch to the first state upon detecting a hardware reset of the device and set the latch to the second state upon completion of a memory update window.

In particular embodiments of the present invention, the latch enable circuit may include a hardware reset circuit which generates a hardware reset of the device, a processor, and a read only memory operably associated with the processor and containing a program utilized to update the programmable memory, wherein the program is configured to set the latch to the second state. Furthermore, the processor may be configured to execute the program contained in the read only memory upon generation of the hardware reset of the device. In still further embodiments of the present invention, the program is configured to set the latch to the second state upon completion of execution of the program.

In particular embodiments of the present invention, the processor comprises a digital signal processor.

In still further embodiments of the present invention, the memory controller is further configured to allow read operations of the read only memory when the latch is in the first state and prevent read operations of the memory when the latch is in the second state.

In additional embodiments, a plurality of devices having differing functionality may be provided by providing a plurality of generic processing devices having hardware suitable to perform at least a portion of the differing functionality of the plurality of devices, wherein the generic processing devices also have a programmable memory and a read only memory. Updates to the programmable memory define the functionality of the generic processing devices so as to provide the plurality of devices having differing functionality. The programmable memories of the generic processing devices may be selectively updated utilizing an update program provided in the read only memories of the generic processing devices which verifies the authorization of an update and selectively updates the programmable memory based on the verified authorization. Furthermore, updates of the programmable memories of the generic processing devices other than by the update program may be prevented.

In still further embodiments, access to the read only memory containing the update program may be prevented other than when an update of the programmable memory of the generic processing device is being performed. Furthermore, the generic processing devices may include a digital signal processor. In such embodiments, the updates of the programmable memory may provide microcode for controlling the operation of the digital signal processor.

While the invention has been described above primarily with respect to method aspects of the invention, both systems and/or computer program products are also provided.

DETAILED DESCRIPTION OF PREFERRED EMBODIMENTS

Figure 1:
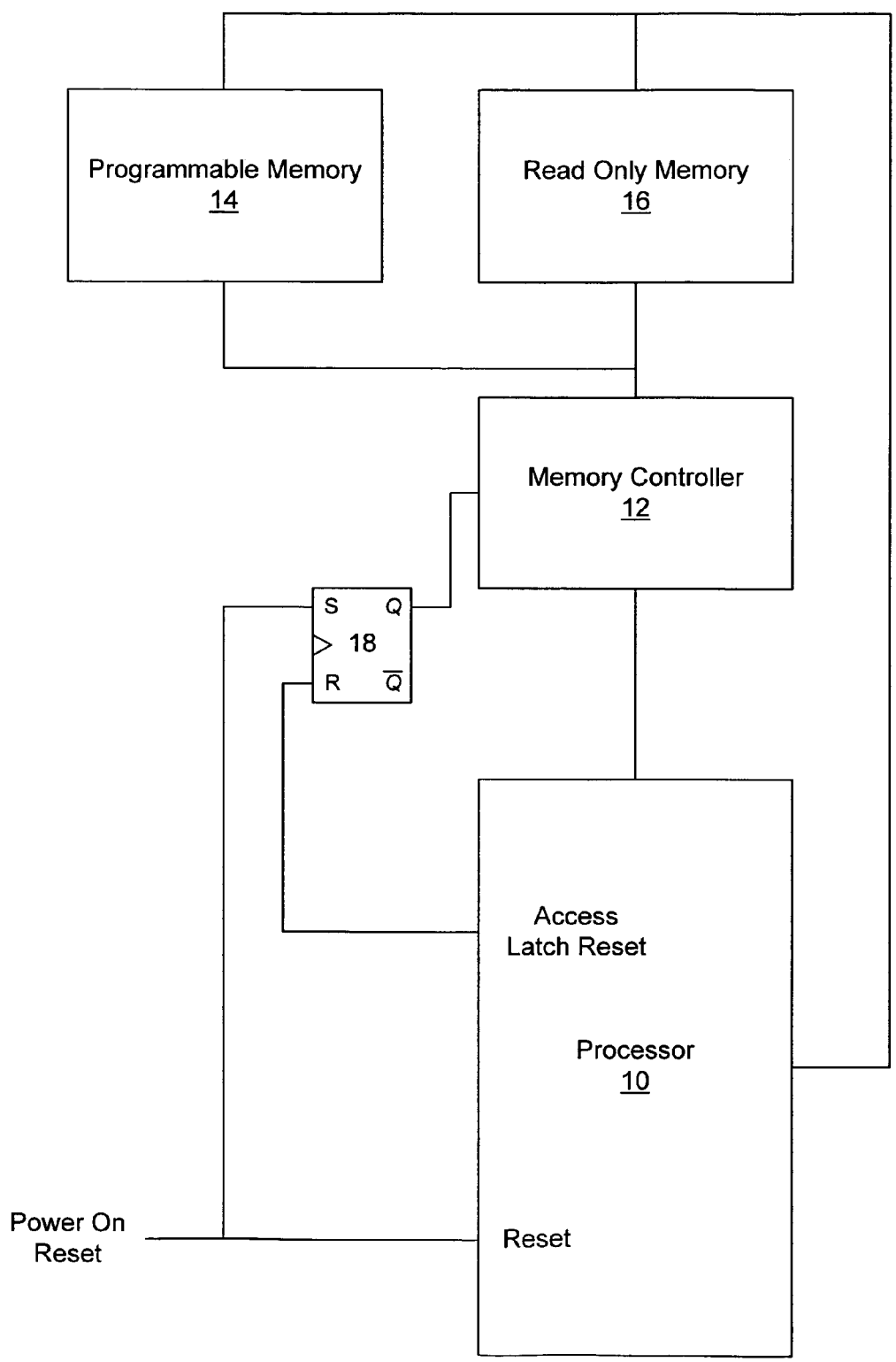
FIG. 1 is a block diagram of a firmware update system according to embodiments of the present invention.

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects. Furthermore, the present invention may take the form of a computer program product on a computer-usable storage medium having computer-usable program code means embodied in the medium. Any suitable computer readable medium may be utilized including hard disks, CD-ROMs, optical storage devices, or magnetic storage devices.

The computer-usable or computer-readable medium may be, for example but not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in an object oriented programming language such as Java®, Smalltalk or C++. However, the computer program code for carrying out operations of the present invention may also be written in conventional procedural programming languages, such as the "C" programming language or even assembly language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, embedded processor or other programmable data processing apparatus to produce a machine, such that the instructions, which execute via the processor of the computer or other programmable data processing apparatus, create means for implementing the functions specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and/or block diagram block or blocks.

As is described in more detail below, embodiments of the present invention may provide secure firmware updates by providing a window in which firmware updates may be provided. Such a window may be provided by a latch or other such device which may be set to allow update access to the programmable memory device(s) where the firmware to be updated resides and which may be set to prevent update access to the programmable memory device(s). Furthermore, some or all of the program which performs the firmware update may be stored in a Read Only Memory (ROM) of the processing system and the program may set the latch to prevent updates of the programmable memory device(s) upon completion of the update program. Update systems according to embodiments may, for example, be incorporated into a boot sequence of a processing device to provide secure firmware update capabilities. Additional embodiments of the present invention may utilize cryptographic techniques to further increase the security of the firmware update. Various embodiments of the present invention will now be described with reference to FIGS. 1 through 11.

Referring now to FIG. 1, a firmware update system according to embodiments of the present invention is illustrated. As is seen in FIG. 1, a processor 10, such as a general purpose microprocessor, a digital signal processor or a specific purpose processor has associated with it a latch 18 which defines a state of access permissions to a programmable memory 14 and/or a read only memory (ROM) 16. Such access may be controlled by a memory controller 12 or other such device which allows the processor 10 to access the programmable memory 14 and the read only memory 16.

In particular, the programmable memory 14 may be flash RAM or other programmable memory which may contain firmware, such as a BIOS program or other such firmware, which may provide the basic functionality of the device incorporating the processor 10. The processor 10 may access the programmable memory 14 through the memory controller 12 to execute instructions stored in the programmable memory 14 or to update the contents of the programmable memory 14. The processor 10 may also access the ROM 16 to execute a firmware update program stored in the ROM 16.

In operation, the processor 10 receives a hardware reset signal, such as the power on reset signal illustrated in FIG. 1, which causes the processor 10 to reset its registers and being execution of a program from a predefined memory location. Thus, the latch 18 can be set into an initial state by a hardware reset, which is the means to return the processor 10 to a known non-debug state executing a specific instruction stream (e.g. the instruction stream stored in the ROM 16). In particular embodiments of the present invention, the predefined memory location corresponds to a memory location in the ROM 16. In addition to resetting the processor 10, the reset signal also sets the latch 18 to a state which instructs the memory controller 12 to allow access to the ROM 16 (i.e., read operations) and to allow updates (i.e. write operations) to the programmable memory 14. Thus, for example, when the "Q" of the latch 18 is a logical "1" the memory controller 12 may allow reads of the ROM 16 and writes to the programmable memory 14.

As is further illustrated in FIG. 1, an output of the processor 10 may also be provided to reset the latch 18 so as to prevent updates of the programmable memory 14 and optionally prevent read operations to the ROM 16. Thus, when the firmware update program executed from the ROM 16 is concluding it may activate the access latch reset output of the processor 10 to reset latch 18. In the example described above, the access latch reset output would reset latch 18 so that the "Q" output was set to a logical "0" so as to prevent write operations to the programmable memory 14 and prevent read operations to the ROM 16. Thus, the latch 18 may provide a security window during which the programmable memory 14 may be updated. The ROM 16 may provide an update program which may be securely maintained so as to reduce the likelihood of tampering with the update program because the hardware reset forced the processor 10 to a known non-debug state executing the software code of the update program which may reside in a non-updateable ROM such as ROM 16.

As will be appreciated by those of skill in the art, while FIG. 1 illustrates the processor 10, memory controller 12, programmable memory 14, the ROM 16 and the latch 18 as separate blocks, these blocks are functional blocks and need not correspond to physical divisions of the functions. Thus, for example, the memory controller 12, the ROM 16 and the latch 18 may be incorporated into a single integrated circuit. Furthermore, additional or fewer functional blocks may also be provided while still benefitting from the teachings of the present invention. For example, multiple memory controllers or no memory controller could be provided. In multiple memory controller embodiments, the multiple memory controllers may receive the output of the access latch 18. In embodiments with no memory controllers, the processor 10 may receive the output of access latch 18 and control access to the programmable memory 14 and/or the ROM 16 itself. Thus, the present invention should not be construed as limited to the particular configuration illustrated in FIG. 1 but is intended to encompass other configurations capable of carrying out the operations and/or functions described herein.

Figure 2:
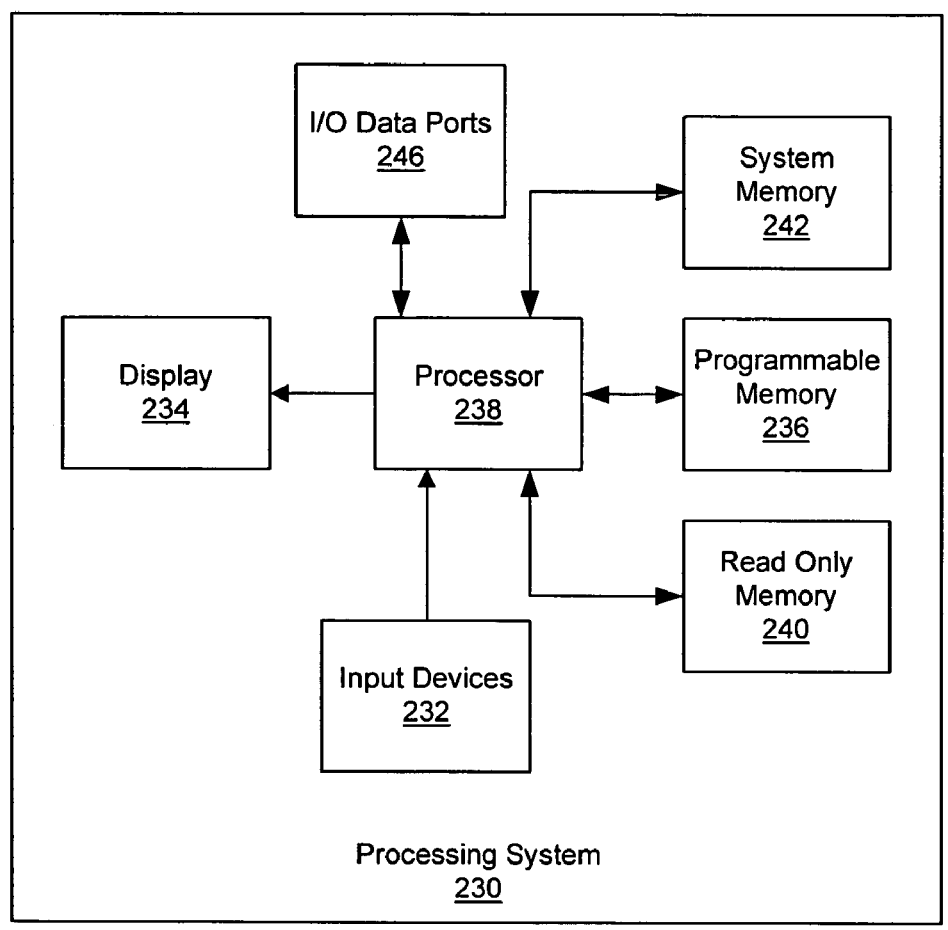
FIG. 2 is a block diagram of a data processing system suitable for use with the present invention.

An exemplary embodiment of a data processing system 230 suitable for use in accordance with embodiments of the present invention is illustrated in FIG. 2 and may include input device(s) 232 such as a keyboard or keypad, a display 234, and a programmable memory 236, a Read Only Memory 240 and a system memory 242 that communicate with a processor 238. The data processing system 230 may further include I/O data port(s) 246 or other such devices that also communicate with the processor 238. The I/O data port 246 can be used to transfer information between the data processing system 230 and another computer system or a network (e.g., the Internet) or to other devices controlled by the processor 238. These components may be conventional components such as those used in many conventional data processing systems which may be configured in accordance with the present invention to operate as described herein.

Figure 3:
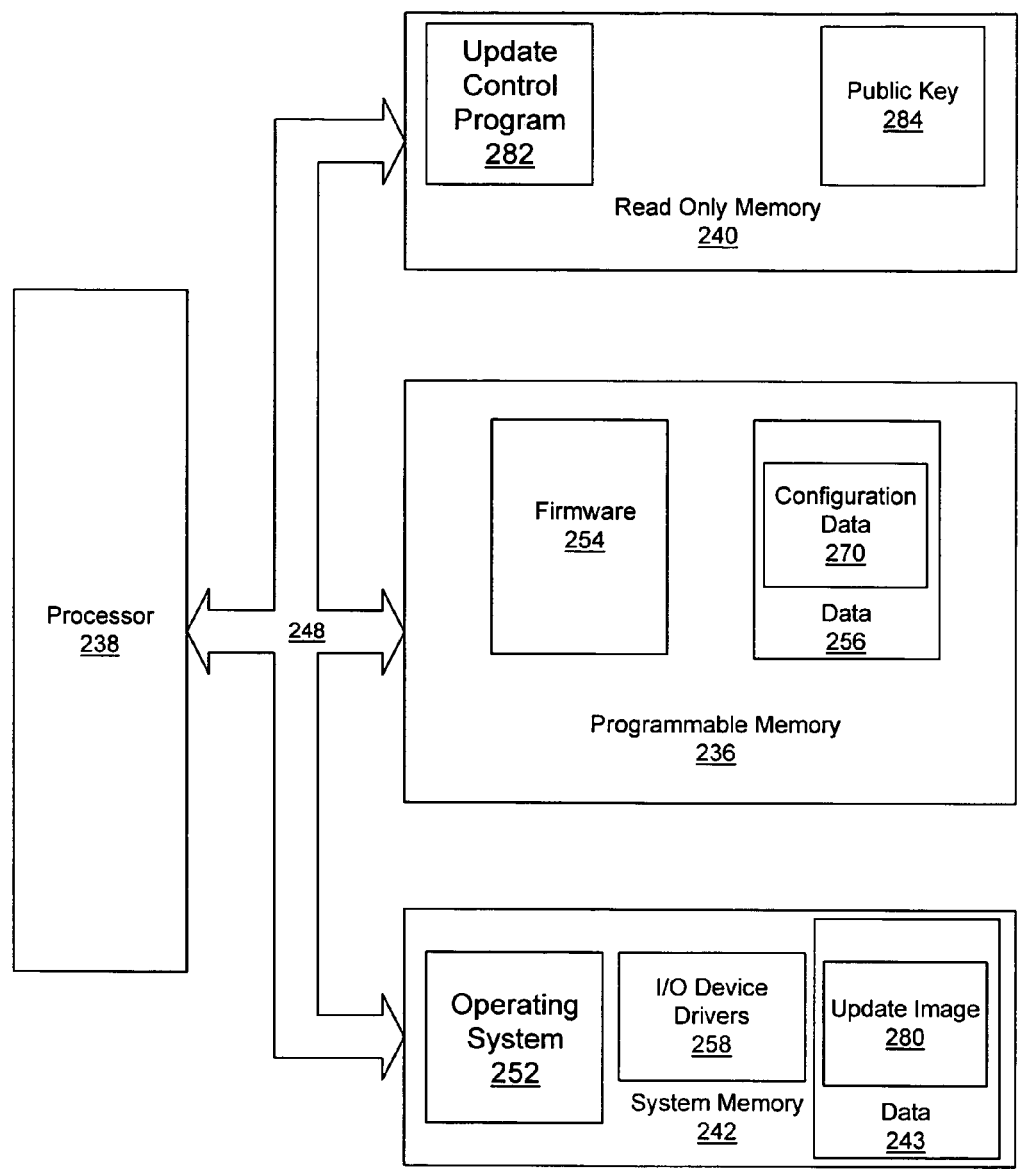
FIG. 3 is a more detailed block diagram of data processing systems according to embodiments of the present invention.

FIG. 3 is a block diagram of data processing systems that illustrates systems, methods, and computer program products in accordance with embodiments of the present invention. The processor 238 communicates with the programmable memory 236, the read only memory 240 and the system memory 242 via one or more address/data bus(ses) 248. The processor 238 can be any commercially available or custom microprocessor.

The programmable memory 236, read only memory 240 and the system memory 242 are representative of the overall hierarchy of memory devices containing the software and data used to implement the functionality of the data processing system 230. The programmable memory 236 can include, but is not limited to static RAM (SRAM), dynamic RAM (DRAM), flash RAM, EEPROM or other such programmable memory devices whose contents may be modified. The read only memory 240 may be of a type which may not be modified after its initial programming, such as ROM or PROM but may also be programmable in certain embodiments of the present invention. Finally, the system memory 242 may comprise one or more of the various types of memory, including the following types of devices: cache, ROM, programmable read only memory (PROM), electrically programmable read only memory (EPROM), EEPROM, flash RAM, SRAM, and DRAM. Thus, the particular designations of memory as programmable memory 236, read only memory 240 or system memory 242 should not be construed as limiting the types of devices utilized to implement such memory but as a characterization of the manner in which the devices are utilized. Accordingly, any memory devices may be utilized that are capable of carrying out the operations described herein.

As shown in FIG. 3, the read only memory 240, may contain the update control program 282 and, optionally, a public key 284 which may be utilized to verify a digital signature of an update image. The programmable memory 236 may contain the firmware program 254 of the processing system 230 as well as data 256 which may include configuration data 270 for the processing system 230.

The system memory 242 may contain several categories of software and data used in the data processing system 230: the operating system 252; the input/output (I/O) device drivers 258; and the data 243. As will be appreciated by those of skill in the art, the operating system 252 may be any operating system suitable for use with a data processing system, such as OS/2, AIX or OS/390 from International Business Machines Corporation, Armonk, N.Y., WindowsCE, WindowsNT, Windows95, Windows98 or Windows2000 from Microsoft Corporation, Redmond, Wash., PalmOS from Palm, Inc., MacOS from Apple Computer, UNIX or Linux, proprietary operating systems or dedicated operating systems, for example, for embedded data processing systems.

The I/O device drivers 258 typically include software routines accessed through the operating system 252 to communicate with devices such as the input devices 232, the display 234, the I/O data port(s) 246, and certain components of the programmable memory 236, read only memory 240 and/or system memory 242. The data 243 represents the static and dynamic data used by the operating system 252, I/O device drivers 258, and other software programs that may reside in the programmable memory 236, the read only memory 240 and/or the system memory 242. For example, the data 243 may include an update image 280 to be utilized in updating the contents of the programmable memory 236.

While the present invention is illustrated, for example, with reference to particular divisions of programs, functions and memories, the present invention should not be construed as limited to such logical divisions. Thus, the present invention should not be construed as limited to the configuration of FIG. 3 but is intended to encompass any configuration capable of carrying out the operations described herein. For example, in particular embodiments of the present invention a single memory array may be utilized to provide the programmable memory 236, the read only memory 240 and the system memory 242. Such a memory array may be partitioned into logical sub-arrays which may provide the access control aspects of embodiments of the present invention.

Figure 4A:
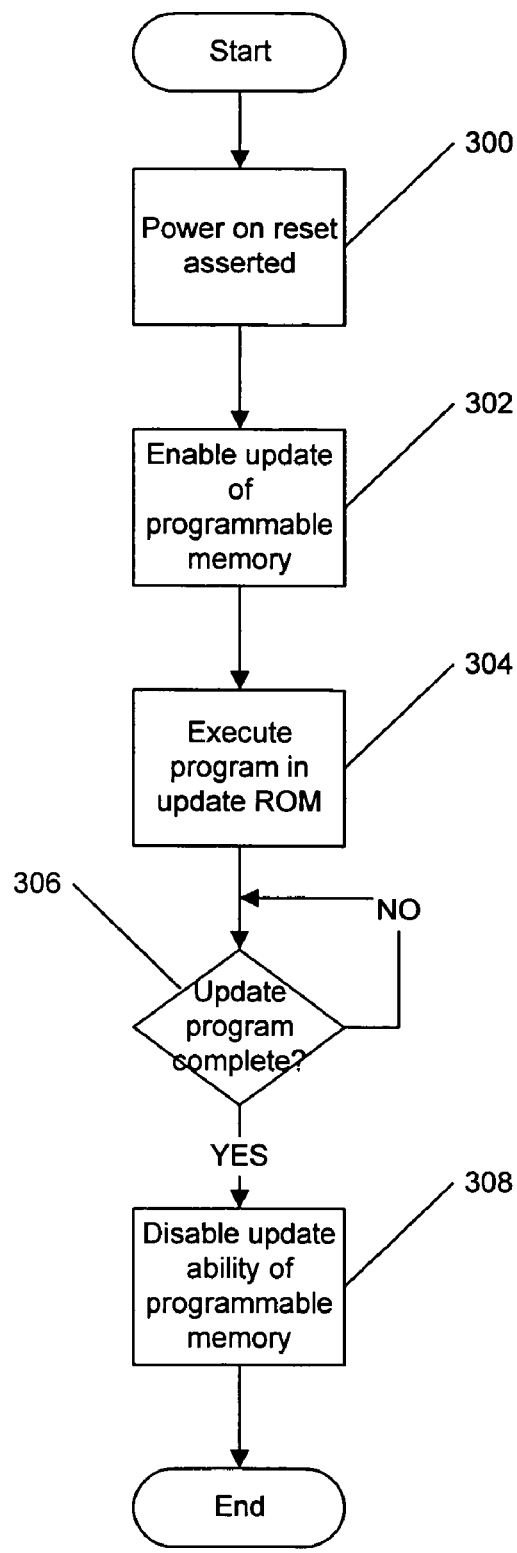
FIG. 4A is a flowchart illustrating operations according to embodiments of the present invention.

Embodiments of the present invention will now be described in more detail with reference to FIGS. 4A and 4B which are flowchart illustrations of operations according to embodiments of the present invention. As seen in FIG. 4A, upon assertion of a hardware reset signal (block 300)—such a reset may be asserted by hardware circuitry or by software assertion of the hardware reset—the update capability of the programmable memory of the processing system is enabled (block 302). Such an enable may be provided by the latch 18 providing an enable signal to the memory controller 12 to control write operations to programmable memory 14 in the system of FIG. 1. However, as will be appreciated by those of skill in the art, other techniques of selectively enabling the update capabilities of a programmable memory may also be utilized in accordance with the teachings of the present invention.

With the update capability of the programmable memory enabled, an update program, which may be stored in a ROM, may be executed to perform the update of the programmable memory (block 304). When the update is complete (block 306), the update program may disable the update capability of the programmable memory (block 308). In the example illustrated in FIG. 1, the update program may be executed from the ROM 16 and the latch 18 reset by the processor 10 according to instructions in the update program so as to prevent updates of the programmable memory 14 after completion of the update program. Again, however, as will be appreciated by those of skill in the art, other techniques of selectively disabling the update capabilities of a programmable memory may also be utilized in accordance with the teachings of the present invention. Whatever particular system is utilized, systems according to embodiments may provide an update window between, for example, the initiation of the hardware reset and the completion of the update program during which the programmable memory may be updated. This update window may, among other things, reduce the likelihood of malicious attacks on the program stored in programmable memory.

Figure 4B:
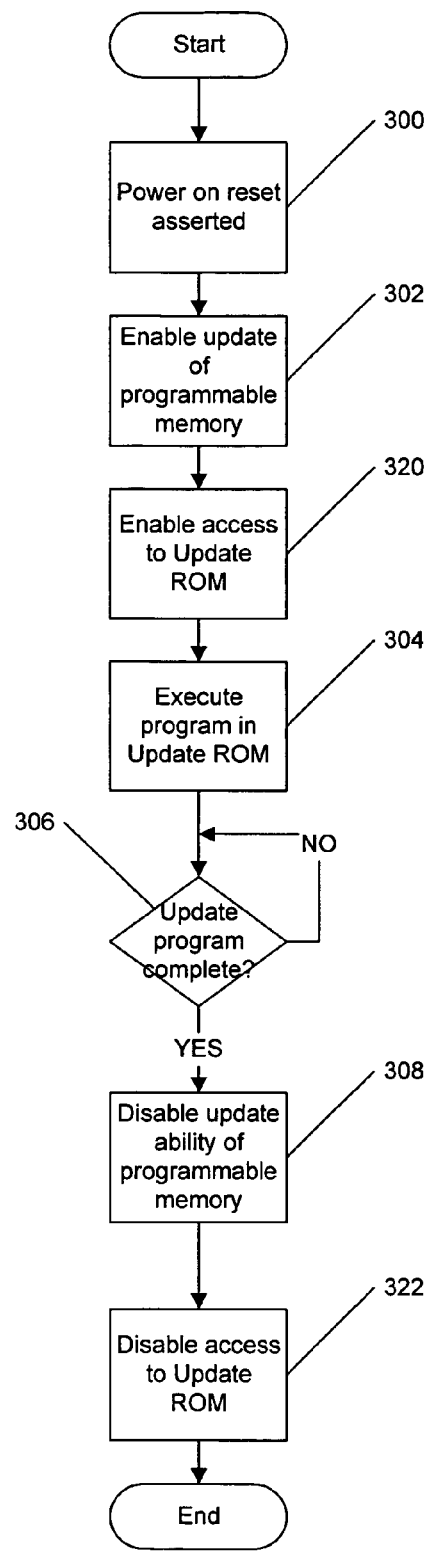
FIG. 4B is a flowchart illustrating operations according to further embodiments of the present invention.

FIG. 4B illustrates operations according to further embodiments of the present invention. As is seen in FIG. 4B, the operations are similar to those of FIG. 4A, however, access to the update program (e.g. the ROM where the program is stored) is also enabled (block 320) by, for example, the hardware reset signal or the update capability of the programmable memory being enabled. Thus, for example, in the system illustrated in FIG. 1, read access to the ROM 16 may be enabled when update capabilities of the programmable memory 14 are enabled. Thus, the latch 18 may also control access to the ROM 16 by the processor 10. After enabling access to the memory where the update program is stored, the update program is executed (block 304) and, when complete (block 306), the update access to the programmable memory is disabled (block 308) and the read access to the memory where the update program is stored is also disabled (block 322).

In the example illustrated in FIG. 1, the update program may be executed from the ROM 16 and the latch 18 reset by the processor 10 according to instructions in the update program so as to prevent updates of the programmable memory 14 and prevent read access to the ROM 16 after completion of the update program. However, as will be appreciated by those of skill in the art, other techniques of selectively enabling and disabling access to the memory where the update program is stored may also be utilized in accordance with the teachings of the present invention. Thus, in the embodiments illustrated in FIG. 4B, update capabilities of the programmable memory and access to the update program may be windowed by, for example, the hardware reset and the completion of the update program. By restricting access to the program to the limited window when the programmable memory may be updated, the likelihood that the update program may be analyzed or otherwise accessed for purposes of overcoming the security features provided by embodiments of the present invention may be reduced.

Figure 5:
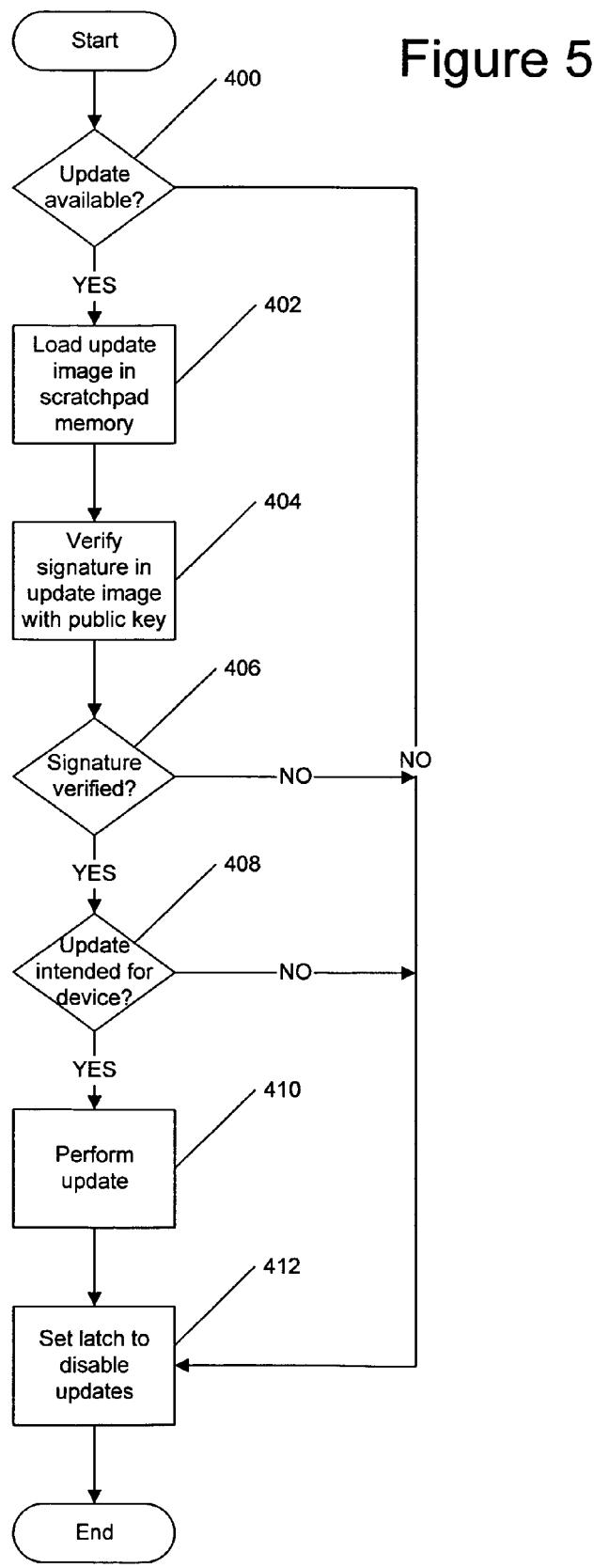
FIG. 5 is a flowchart illustrating operations for performing a firmware update according to embodiments of the present invention.

FIG. 5 illustrates operations according to embodiments of the present invention for performing an update of firmware or other data stored in a programmable memory. For example, in certain embodiments of the present invention, the operations of FIG. 5 may correspond to blocks 304, 306, 308 and 322 of FIGS. 4A and/or 4B. As is seen in FIG. 5, update data may be obtained by providing an "image" of the data to be written to a programmable memory, for example, the programmable memory 14. So as to assure the authenticity of the image to be written to memory, the image may be digitally signed or otherwise encrypted utilizing, for example, an asymmetric key cryptosystem. Asymmetric (or public) key cryptosystems typically use two different keys that are not feasibly derivable from one another, one for encryption and another for decryption. A person wishing to receive secure data generates a pair of corresponding encryption and decryption keys. The encryption key is made public, while the corresponding decryption key is kept secret. Anyone wishing to provide encrypted data to the receiver may encrypt the data using the receiver's public key. Only the receiver may decrypt the message, since only the receiver has the private key.

Asymmetric-key cryptosystems may also be used to provide for digital signatures, in which the sender encrypts a signature message using the sender's private key, the signature messing being a hash or message digest of the message being signed. See, for example, Advanced Cryptography by Bruce Schneier, MD4 and MD5 on pp. 435–441, for a description of conventional hash functions suitable for digital signatures. Because the signature message can only be decrypted with the sender's public key, the recipient can use the sender's public key to confirm that the signature message originated with the sender. One of the best-known asymmetric-key cryptosystems is RSA, named for its originators Rivest, Shamir and Adleman. One version of RSA is defined by ANSI Standard X9.31-1998.

RSA is widely used in many cryptographic systems. RSA gets its security from the difficulty of factoring large prime numbers. See Schneier, op. cit., pp. 466–474, for a description of RSA.

Returning to FIG. 5, in performing an update, preferably during the update window of FIG. 4A or 4B described above, when the processor begins execution of the update program it may be determined if an update is available (block 400). This determination may be made in different manners depending on the particular device or processing system incorporating embodiments of the present invention. For example, in a personal computer, the determination may be made by looking for a special key being held down at boot or a selection on the initial BIOS menu, the existence of a diskette in a drive with a certain volume name, or a particular response to a broadcast over a local area network (LAN) adapter.

For a remotely managed device such as a router, the determination may be made by examining a hardware flag and persistent parameters which are preserved over reset, or even by looking for a firmware image left in RAM by the last boot of the device. One scenario may entail an authorized administrator sending a firmware file to the device via a network protocol such as Trivial File Transfer Protocol (TFTP). The file would be placed in a reserved scratch pad area of RAM. The administrator would then force a hardware reset through the management software, causing the device's non-writable boot ROM to examine the scratch pad RAM for a valid firmware update image.

As may be seen from the above example, various mechanisms may be utilized for determining that a firmware update is available and, thus, the present invention should not be construed as limited to a particular methodology of determining if a firmware update is available but may use differing mechanisms depending on the resources and capabilities of the device incorporating the embodiments of the present invention.

If an update is not available (block 400), then the update program may terminate by disabling access to the programmable memory (block 412). However, if an update is available (block 400), then the update may be read into scratch-pad memory (block 402), such as RAM, for evaluation and authentication. The update image may be read into memory from various sources including a floppy disk, a CD-ROM or other removable or fixed media, from a serial port, from a LAN attached server, etc. If the image is already placed into RAM or other scratchpad memory by, for example, an administrator, then the operations of block 402 may be skipped.

Alternatively, the existing firmware image could be backed-up by copying it to an unused memory range before the new image replaces the original. Such a copy could provide a source allowing an option to restore the previous firmware if the new image proved to be flawed. The signature of the former firmware image would be checked before reinstallation to ensure that it has not been modified or corrupted. Such a copy could be made in the programmable memory and returned to by modifying pointers to reflect the copy location or could be in a separate memory and then restored to the programmable memory. By combining the restore capability with instructions for performing an update imbedded in the image, a system that allowed enablement of new features without reinstallation of the image could be provided.

As described above, the candidate image may include a certificate or chain of certificates which may provide a means of verifying a digital signature included with the update image. The update program utilizes a public key corresponding to the private key of the authority authorized to provide updates and verifies the signature of the update image using the public key (block 404). If the results do not match, then the signature is not verified (block 406) and the image is rejected, the update procedure terminated and the latch set to disable updates (block 412).

For example, the public key of an X.509 certificate authority may be incorporated in the ROM where the update program is stored and utilized to verify a certificate provided with the update image by decrypting the signature of the certificate utilizing the public key as described above and comparing the results to an expected result, such as a hash computed using the hash algorithm specified in the certificate. Alternatively, the public key may be incorporated in a previous update image and the update program may access the programmable memory to obtain the previous public key to verify the signature. The subsequent image could then provide a new public key for future use by the update program. This means that the update program would verify the signature of a new firmware image using the public key field from the current firmware image. Thus, the trust tree may be updated in the firmware revision process. Updating the trust tree may provide additional flexibility, for example, in case of future changes in certificate authorities, in case a product line is sold to a different company, or in case a merger takes place in which a product introduced by one manufacturer is later supported by a different manufacturer. In such a manner the public key utilized by the update program need not be static but may be dynamically changed.

If the update image is verified, then it may be determined if the image is intended for the device (block 408). This determination may be made, for example, by evaluating the target machine model(s) or serial number(s), trust chain, prior firmware release level prerequisite or other parameters governing the upgrade. Rules for determining if the intended image is intended for the device may be incorporated in the update program, the update image, certificate extensions associated with the update image or combinations thereof. If the update is not intended for the device, the update procedure may be terminated and the latch set to disable updates (block 412). In alternative embodiments of the present invention, the determination of whether the update image is intended for a particular device may be made by signing the image with differing private keys based on the public key provided in a previous update image. In such a system, the determination of whether the signature was verified may also be utilized to determine if the update image is intended for the device.

If the update is intended for the device (block 408), then the update may be performed (block 410). Such an update may be performed by copying the image from scratchpad memory to the programmable memory. If the hardware architecture for a particular machine requires that firmware execute from high-speed RAM (rather than, for example, from flash RAM), the image may be copied from scratchpad memory to a high-speed RAM before the update is performed. The update may be performed by the update program in the ROM, or the firmware image may contain executable code to perform the firmware update such as by selectively patching the programmable memory, or a combination of updates may be performed by the update program in the ROM and the program provided with the image. When the update procedure is complete, the latch may be set to disable updates (block 412).

In embodiments of the present invention where the update image includes instructions to perform the update, these instruction may include instructions on how to write the image to the programmable memory. These instructions could be by way of executable code containing an installation program which may be used to perform a sophisticated differential patching procedure on the firmware or extend the basic "all or nothing" certificate extension rules to include installation of enhancements based on local persistent variables such as a license key resulting from an earlier web or telephone transaction. For example, when a customer pays for a particular hardware feature, the customer could receive a license key based on his device serial number, which would allow the customer to reinstall the current standard firmware image release to enable the new feature (as the license key may be based on the unique machine serial number it, typically, cannot be used to apply the feature on any other machine). As described in more detail below, such a system may provide new business models for hardware sales, such as "web upgradeable hardware," allowing the manufacturer to distribute a generic device to a large user population at a low entry price (for example as an Internet Service Provider subsidized entry-level personal computer, cable or DSL modem, etc.), and then provide enhanced functionality to the install-base with for-fee upgrade features.

Figure 6:
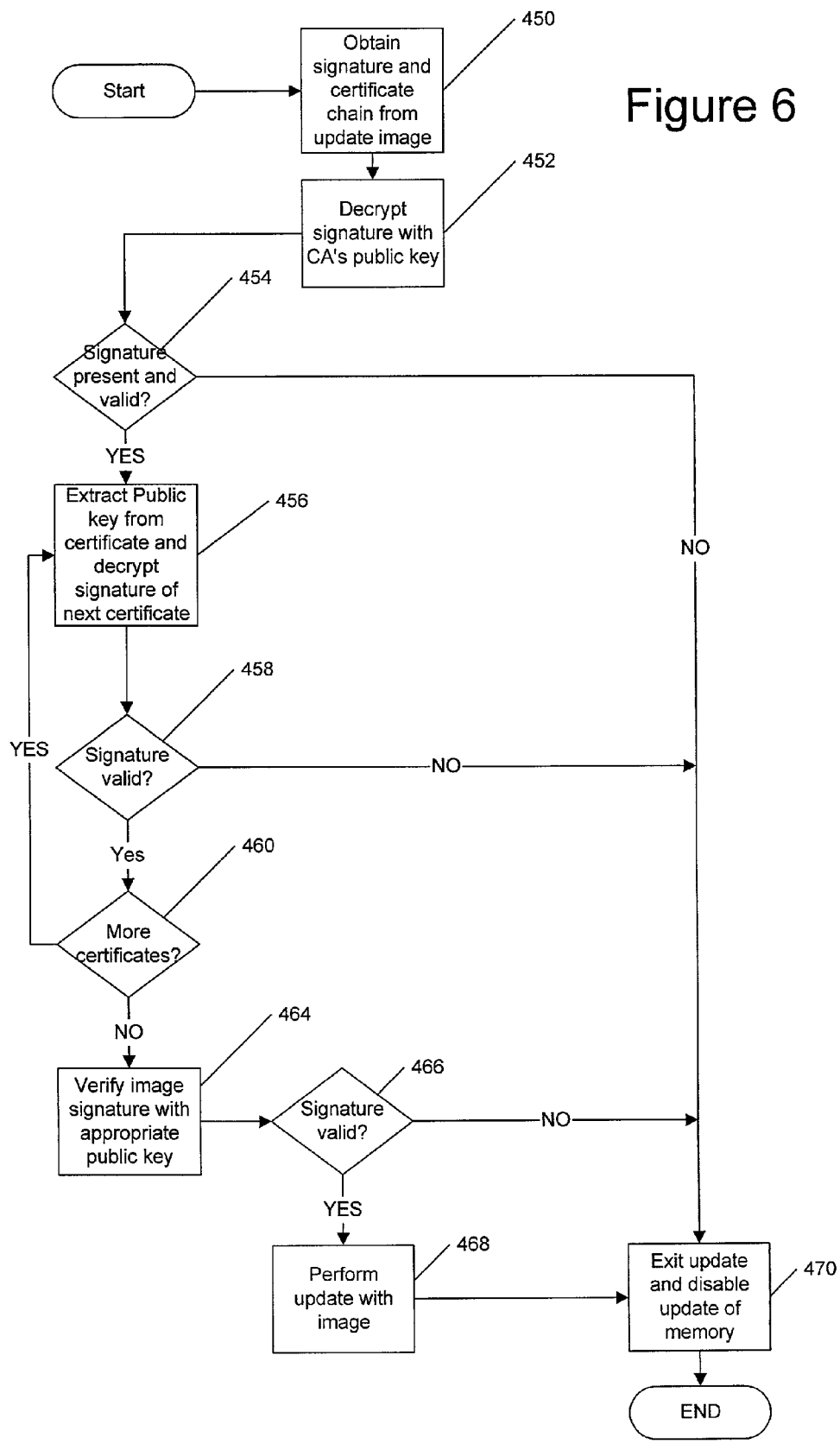
FIG. 6 is a flowchart illustrating operations according to embodiments of the present invention utilizing cryptographic techniques to provide secure firmware updates.

FIG. 6 illustrates operations for performing an update according to embodiments of the present invention utilizing a certificate chain to verify the authenticity of the update image. As is seen in block 450, the certificate chain and signature are obtained from the update image. The signature of the first certificate in the chain is then decrypted utilizing the public key available to the update program (block 452). If the signature is invalid (block 454), the update process is terminated and the update of programmable memory disabled (block 470). If the signature is valid (block 454), the public key of the next certificate is extracted from the certificate and the signature of the next certificate in the chain decrypted utilizing the extracted public key (block 456). If this next certificate does not have a valid signature (block 458), the update process is terminated and the update of programmable memory disabled (block 470). This process is repeated until all of the certificates/signatures in the chain of certificates have been evaluated (block 460).

The image signature is verified with the appropriate public key (block 464). If the signature is invalid (block 466), the update process is terminated and the update of programmable memory disabled (block 470). If the signature is valid (block 466), the update is performed (block 468), the update process is completed, and the update of programmable memory disabled (block 470).

FIG. 6 describes possible logical sequences that may be to validate certificates in a chain. In FIG. 6, the chain is checked from the highest level in the chain, the certificate authority, towards the lowest level, the update authority's certificate. Checking may also be performed in the reverse order, from the lowest-level certificate towards the root certificate authority's certificate, stopping when one recognizes the public key that signed a particular certificate as being trusted.

Thus, as seen in FIGS. 5 and 6, embodiments of the present invention may utilize a certificate or a chain of certificates, preferably in connection with the windowing aspects described with reference to FIGS. 4A and 4B, to provide increased security for programmable memory updates, such as firmware updates. The use of signed update images may, for example, decrease the likelihood that a firmware update may be "faked" by a malicious third party or an unauthorized firmware update applied.

Figure 7:
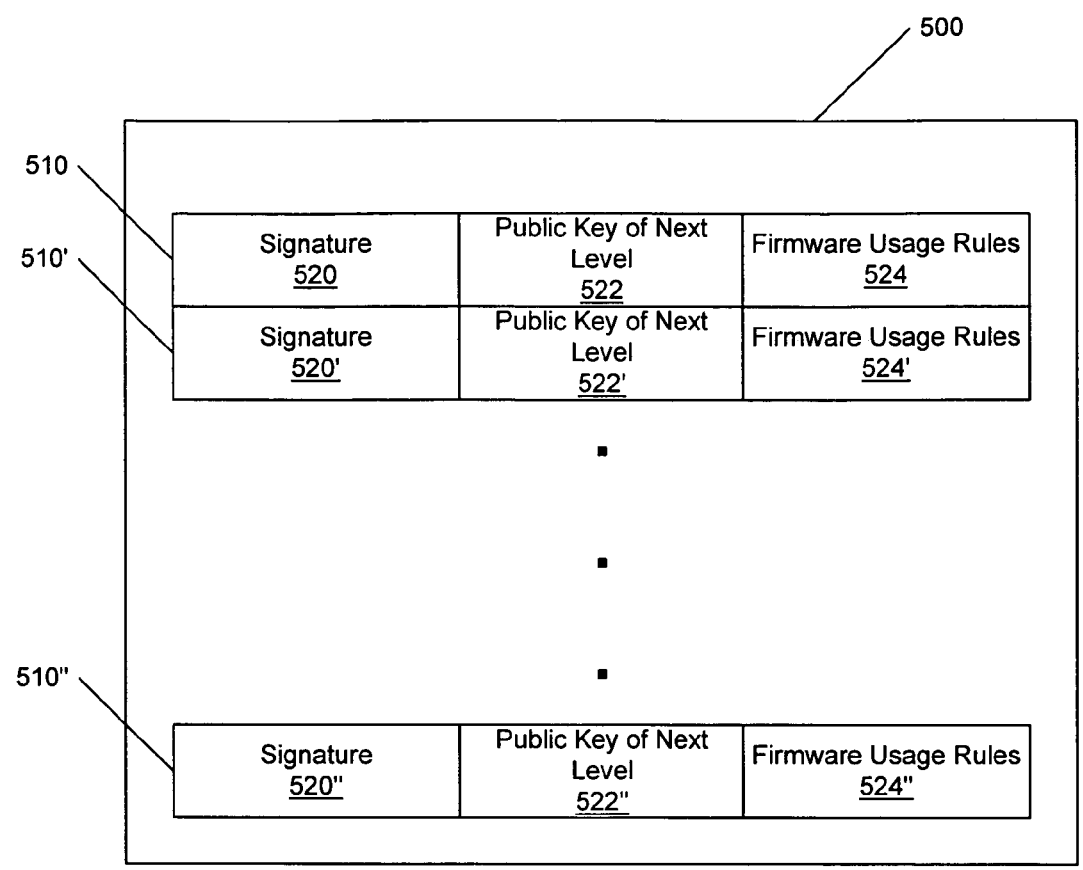
FIG. 7 is a block diagram of a certificate structure according to embodiments of the present invention.

FIG. 7 is a block diagram illustrating a certificate structure having certificate extensions which may be utilized in rules-based embodiments of the present invention. As seen in FIG. 7, a certificate chain 500 is illustrated as having a plurality of certificates 510, 510' and 510". The certificates each may include a digital signature 520, 520' and 520", the public key of a next level in the certificate chain 522, 522' and 522" and may include as an extension to the certificate 524, 524' and 524", firmware usage rules which may specify rules which may be utilized in determining the application of the update image associated with the certificate chain 500. While illustrated in each of the certificates 510, 510', and 510", firmware usage rules may be incorporated into less than all of the certificates 510, 510', and 510", or even in a single certificate. For example, in FIG. 7 the public key 522 can be used to verify the certificate 510' and the public key 522' can be used to verify certificate 510", which is the highest certificate in the chain shown here. The public key of the root certificate authority is known a priori. Usually the top certificate in the chain is the certificate of the certificate authority and is usually self-signed. Furthermore, the firmware usage rules may be incorporated as extensions to the certificates. Certificate extensions are known to those of skill in the art and, therefore, will not be described further herein.

As described in further detail herein, the firmware usage rules may be evaluated in order, and, if the result of any rule is "OK," then the update program may update the firmware. If all rules fail the update may be terminated. Alternatively, the rules may be structured such that all the rules must be satisfied before the update procedure is carried out. In any event, these rules may refer to values which are part of the new image (for example the image version or date, range of MAC addresses, etc.), part of the active flash image, and/or values in ROM (for example, the manufacturer, model, adapter MAC or serial number, or other criteria for application of the update image. Furthermore, the rules may also be utilized to selectively apply the update image, for example, to allow a single update image to provide different updates based on the evaluation of the rules.

Such a rule-based mechanism may provide a manufacturer or administrator increased flexibility over conventional techniques which typically utilize a unique firmware update for each kind of device. Such flexibility has the potential to reduce the cost of providing firmware updates and the customer enterprise's cost for performing configuration management. Using this rules-based scheme may provide for a single image containing firmware updates for several different kinds of devices, patches containing partial updates could be applied to specific firmware versions or devices, and one can account for situations where a single hardware design is sold under several different brand names, all of which may provide for improved business methods.

For example, a manufacturer might release a firmware patch that should be applied to fix a problem in a chip found on Ethernet adapters with a certain range of Media Access Controller (MAC) addresses in two models of its cable routers sold under two brand names running some range of firmware versions. The firmware update could be provided to all cable routers and the rules could evaluate the MAC addresses of the cable router to determine if the update was to be applied.

Figure 8:
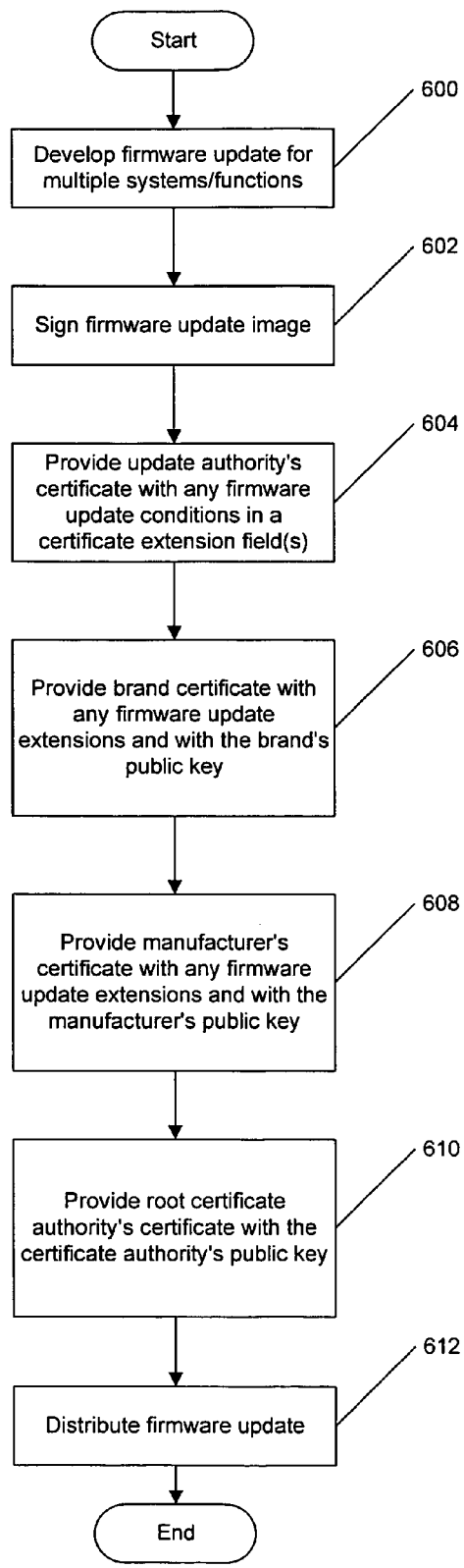
FIG. 8 is a flowchart illustrating operations for creating a firmware update according to embodiments of the present invention.

Operations for providing firmware updates utilizing a certificate hierarchy in an exemplary development environment having an update authority which develops firmware updates, a brand level associated with a particular brand of a device, a manufacturer level associated with the manufacturer of the device and a certificate authority associated with the public key of the update programs of the devices are illustrated in FIG. 8. As seen in FIG. 8, the firmware update(s) is developed (block 600) and may include differing functionality for a generic device or may be compatible with multiple different devices. As described above, the firmware update may include an installation program that may apply patches or may replace the firmware in the programmable memory in its entirety. Alternatively, the firmware update may set flags or otherwise enable particular functions in the existing firmware stored in the programmable memory.

In certain embodiments of the present invention, the update image may be accompanied by a digital signature of the image and a certificate chain consisting of one or more X.509 certificates or other suitable certificates. The digital signature may be created using the private key associated with one of the certificates of the certificate chain. The signature and certificate chain—in combination with the public key of a trusted certificate authority—enable the image recipient to trust the validity of the image, the certificates, and any ancillary data contained in the certificates. Trust is established through cryptographic techniques that the recipient can perform to (1) authenticate the image signer by tracing the certificate chain back to a trusted authority, and/or (2) prove the image's integrity (i.e., that the image has not been corrupted since it was signed). In addition, rules governing the application of the image to a particular device can be incorporated into one or more of the certificates in the chain. By including the rules as certificate extensions, the recipient can establish its trust for the rules in the same operations that establish its trust of the image. That is, (1) the source of the rules can be authenticated and/or (2) the integrity of the rules can be proven.

As described herein, the certificate whose corresponding private key signed the image is referred to as the "lowest" certificate in the chain. This certificate identifies the entity that created and signed the image. This entity is also referred to as the "update authority". The next-higher certificate in the chain is referred to as the "parent" of a given certificate, and the same given certificate, from the parent's perspective, as the "child".

A chain of certificates is an arbitrary number of certificates consisting of a child, that child's parent, the parent's parent, etc. Every certificate except the highest one in the chain is signed by the private key of its parent, indicating that parent's trust for its child. By traversing the certificate chain—typically from the bottom to the top—a recipient is able to establish an unbroken chain of trust that allows it to trust the child if it trusts one of the child's parents.

To authenticate an update image and prove its integrity, the recipient may compute a hash of the image, decrypt the signature using the public key of the signer (which is provided as part of the signer's certificate), and compare the result with the computed hash. If they match, the image's integrity and the signer's authenticity are considered established. However, to establish the recipient's trust of the signer, the recipient traverses and validates each certificate in the certificate chain, cryptographically establishing a chain of trust back to a trusted certificate authority, as follows.

The recipient examines the next-higher (parent) certificate in the certificate chain. The parent conveys its trust of the child by digitally signing the child's certificate using the parent's private key. Validation of the parent's trust for the child may be done by computing a hash of the child's certificate, decrypting the provided signature with the public key of the parent (provided in the parent's certificate), and comparing the result with the computed hash. If the results match, the recipient has cryptographically established that the parent trusted the child, and by inference the recipient can trust the child. This process is repeated recursively for each next-higher certificate in the chain until the recipient encounters a certificate that it can validate using a public key that it possesses a priori and, therefore, is part of a pre-existing trust relationship with the owner of the public key. Typically this is the certificate of a trusted root certificate authority, although it need not be the top entity in the chain.

In certain circumstances less than all of the chain may be analyzed if a trusted entity is reached before the end of the chain. Furthermore, certificates in the chain which are parents to a certificate of the trusted entity but which are not otherwise trusted may be ignored, as the recipient may be unable to establish that they are trusted absent a parent to such certificates being trusted by the recipient. Because the certificates may contain rules for application of an update image, to avoid unauthorized or unscrupulous manipulation of the application of the update image, the application rules which are utilized in applying an update may be limited to those rules from a certificate for which a trust relationship has been established. Thus, any rules provided in certificates without an established trust relationship may be disregarded. Accordingly, in certain embodiments of the present invention, less than all of the certificates in a certificate chain (i.e. a hierarchy of certificates) may be evaluated. Alternatively all of the certificates in a chain may be evaluated and those for which a trust relationship has been established utilized in performing an update.

After developing the firmware update, the update image is signed with a private key (block 602) of an update authority. The image update is provided to a recipient along with the digital signature and a certificate chain containing a certificate of the update authority corresponding to the private key (block 604). The update authority's certificate may contain update conditions in certificate extensions (block 604).

Any one or more of the certificates in the chain may incorporate rules in a certificate extension, which a recipient may utilize to selectively apply the firmware update. The incorporation of such rules are shown in blocks 604, 606, and 608.

In the example shown in FIG. 8, the update authority could be a product support group that is responsible for creating image updates. Its parent could be a brand authority that authorizes the product support group to create updates for the product line that it manages (block 606). The brand authority's parent could be a manufacturer or corporation that authorizes the brand authority to manage the brand on its behalf (block 608). The manufacturer's parent could be a root certificate authority that certifies the manufacturer's authenticity as a legally responsible business entity (block 610). The FIG. 8 example shows a certificate chain comprising four certificates, although a different number of certificates (as few as one) could be used while still benefitting from the teachings of the present invention. Thus, the present invention should not be construed as limited to a particular number of certificates.

The firmware update signed by the update authority and the certificate chain is distributed to a recipient (block 612).

By providing a chain of certificates, the integrity of the update image may be maintained during the development and distribution process. Furthermore, by providing for rules which may control how the update image is applied, a common update image may be utilized to provide differing functionality to a generic device or provide differing updates for differing devices. Such applications may be controlled by the particular authorities which provide the certificates in the chain.

While the present invention has been described with reference to four authorities, as will be appreciated by those of skill in the art, differing numbers of authorities may be utilized, including a single authority. Furthermore, the authorities described herein are provided merely as an example. Thus, the present invention should not be construed as limited to the particular examples described herein.

Figure 9:
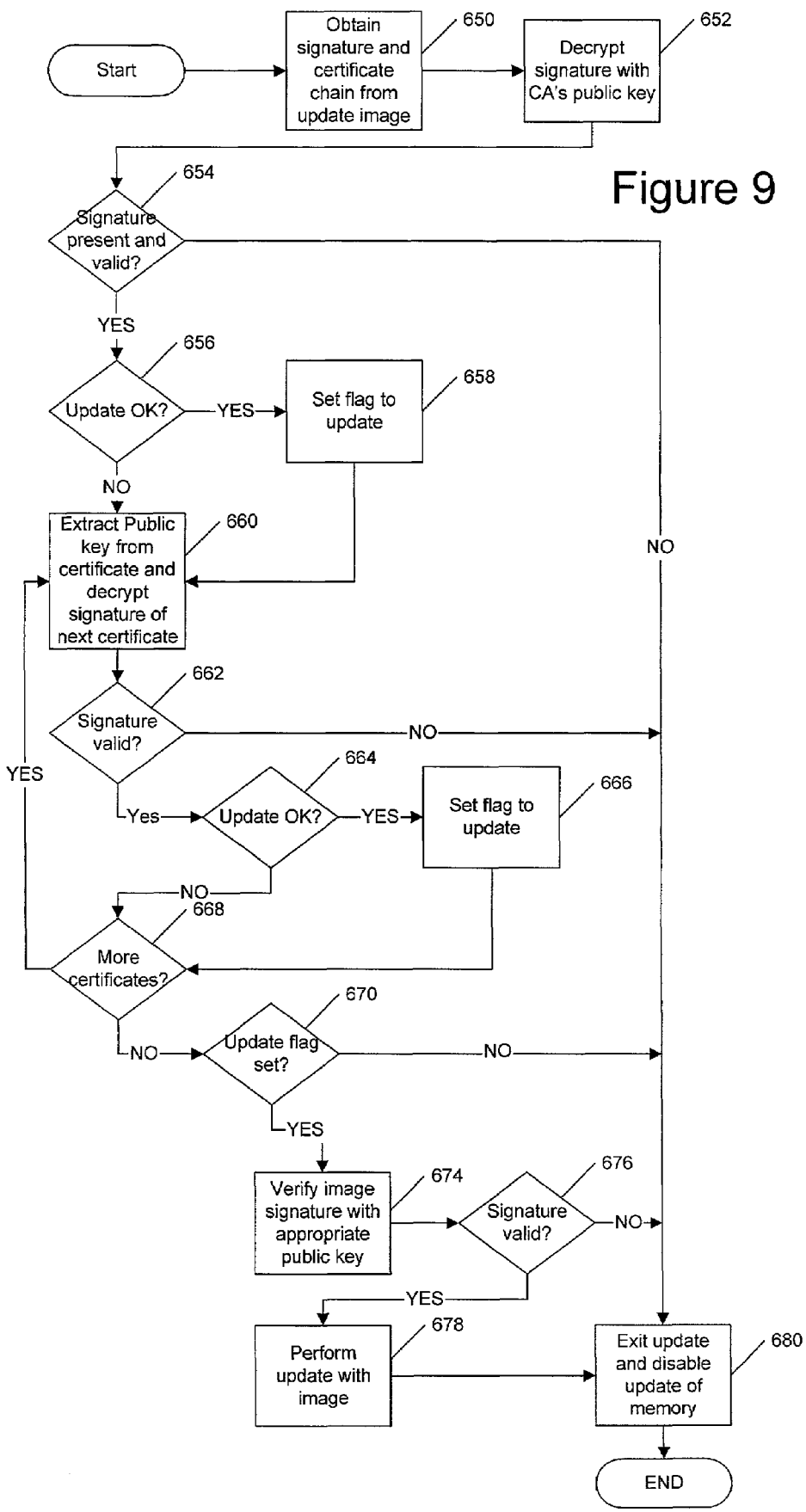
FIG. 9 is a flowchart illustrating operations for performing a firmware update utilizing a certificate structure such as described in FIG. 7.

FIG. 9 illustrates operations for performing an update based on rules specified in a certificate chain as illustrated in FIG. 7 which may be generated as illustrated in FIG. 8. As is seen in block 650, the certificate chain and signature are obtained from the update image. Additionally, the update flag may be reset to a "NO" condition and any other initialization performed. The signature of the highest certificate in the chain is then decrypted utilizing the public key available to the update program (block 652). If the signature is absent or invalid (block 654), the update process is terminated and the update of programmable memory disabled (block 680). If the signature is valid (block 654), it may be determined based on the rules in the extension of the certificate if the update image is to be applied to the device (block 656), if so, then a flag may be set to perform the update (block 658). Any instructions on how to perform the update or otherwise process the update image may also be extracted from the extension to the certificate at block 658.

In any event, the public key of the next certificate is extracted from the certificate and the signature of the next certificate in the chain decrypted utilizing the extracted public key (block 660). If this next certificate does not have a valid signature (block 662), the update process is terminated and the update of programmable memory disabled (block 680). If the signature is valid (block 662), it may be determined based on the rules in the extension of the certificate if the update image is to be applied to the device (block 664). If so, a flag may be set to perform the update (block 666). Any instructions on how to perform the update or otherwise process the update image may also be extracted from the extension to the certificate at block 666. This process is repeated until all of the certificates/signatures in the chain of certificates have been evaluated (block 668). Once all the certificates have been processed, it may be determined if the update flag is set (block 670). If the update flag is not set, then the update process is terminated and the update of programmable memory disabled (block 680). If the update flag is set (block 670), then the update image may be further processed as described below.

The image signature is verified with the appropriate public key (block 674). If the signature is invalid (block 676), the update process is terminated and the update of programmable memory disabled (block 680). If the signature is valid (block 676), the update is performed (block 678), the update process is completed, and the update of programmable memory disabled (block 680).

In either case, where the update is performed, the update may be performed utilizing any parameters or instructions identified in the certificate extensions. Thus, the update may be performed entirely by the update program, by an installation program provided with the image, or by a combination of the two. Furthermore, the installation process may involve any of the techniques described herein for updating the programmable memory.

Figure 10:
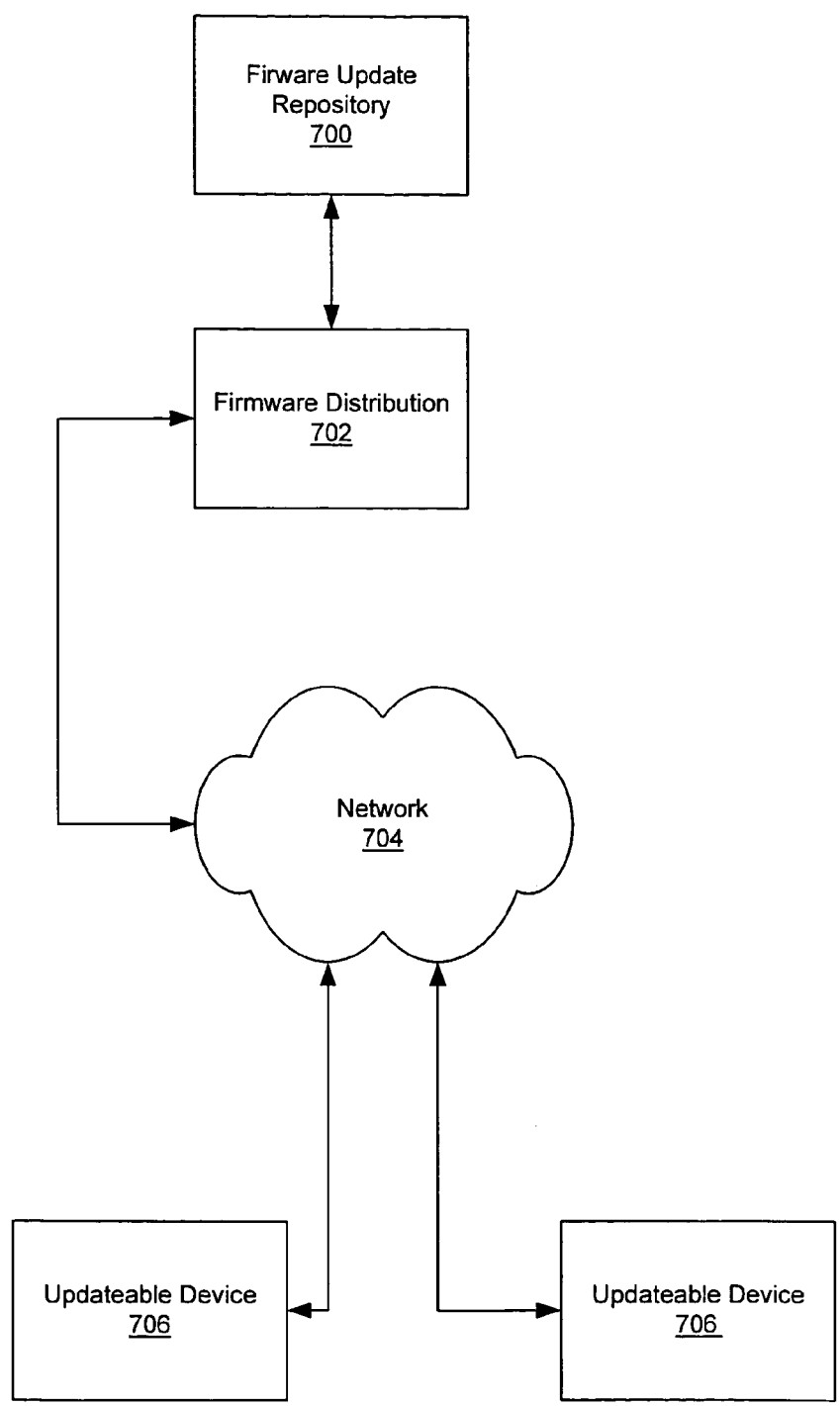
FIG. 10 is a block diagram of a firmware distribution system according to embodiments of the present invention.

FIG. 10 is a block diagram of a system which may provide for the distribution and application of firmware updates according to embodiments of the present invention. A firmware update repository 700 may be provided which includes the firmware update images and/or the corresponding certificates associated with a firmware update. The firmware update repository 700 may be separate from or incorporated with a firmware distribution function 702 which allows for the distribution of firmware updates from the firmware update repository 700 to a plurality of updateable devices 706 and 706' which may be configured and operate as described herein. The firmware update repository 700 and the software distribution function 702 may be servers or other such devices known to those of skill in the art for storing and distributing software. The updateable devices 706 and 706' may be any type of computing device capable of carrying out some or all of the operations described herein. The firmware updates may be distributed over a network 704 which may be the Internet or an intranet. Alternatively, the firmware may be distributed via removable storage media such as diskettes or CD-ROMs. As will be appreciated by those of skill in the art in light of the present disclosure, the embodiments illustrated in FIG. 10 may provide a new method of doing business.

Figure 11:
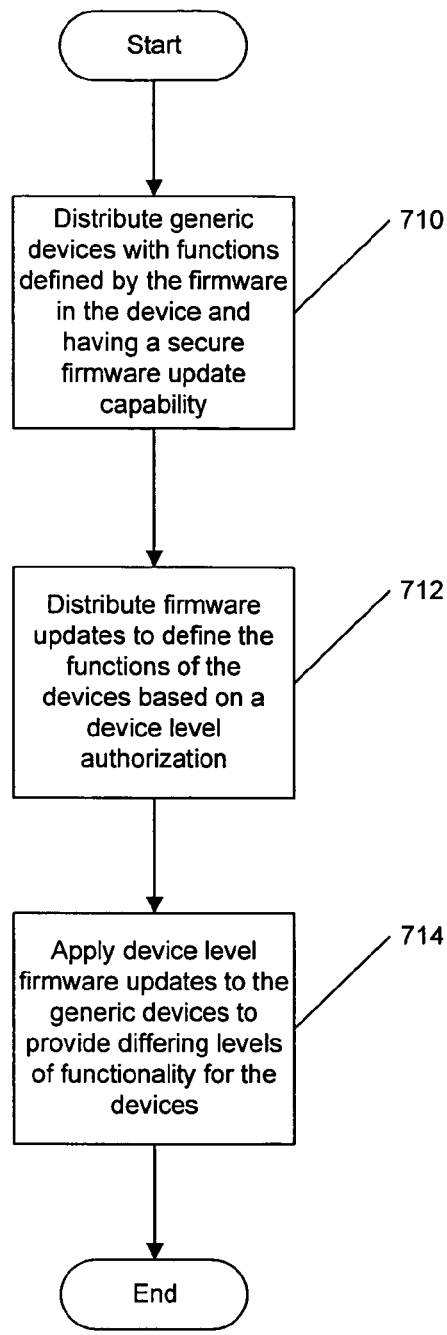
FIG. 11 is a flowchart illustrating operations according to further embodiments of the present invention which may provide for methods of doing business according to embodiments of the present invention.

FIG. 11 illustrates operations for carrying out firmware distribution and update according to embodiments of the present invention which may provide a plurality of different devices having different functionality based on the distribution of a generic computing device. As is seen in FIG. 11, generic devices which are capable of having their functions defined by firmware loaded in the device and having a secure firmware update capability as described herein are distributed (block 710). Firmware updates are then distributed to the devices so as to define the functions of the device based on an authorization associated with the device (block 712). Such authorization may be provided, for example, by identifying a serial number, MAC address license key or other identifier associated with the device, which may be used to provide authorization to the device to update the firmware of the device to provide the authorized functionality. The firmware update may then be provided to the various devices so as to provide differing levels of functionality based on the device on which the firmware update is performed (block 714). As will be appreciated by those of skill in the art in light of the present disclosure, the embodiments illustrated in FIG. 10 may provide a new method of doing business.

While the present invention has been described primarily with reference to personal computers, the teachings of the present invention may be equally applicable to many other types of computing devices utilizing a programmable memory, such as routers, switches, programmable digital assistants, telephones, pagers, laptop computers, CD-ROM drives, palm-tops, video adapters, printers, cable modems, asynchronous digital subscriber loop (ADSL) modems, satellite receivers, digital televisions, home appliances containing embedded microprocessors, information appliances, digital watches, game consoles, handheld organizers, and so forth.

Furthermore, with the recent developments in short-range networking, such as Bluetooth radio and carrier current power networks, the present invention may be applicable to many new micro-controller based products. For example, a pair of wireless stereo headphones containing a microprocessor, memory, communication capability, and voice input/output capability could be securely upgraded to become a cellular telephone, a personal messaging system, a music-file download manager, or a pager, by means of a microcode download transmitted wirelessly from, for example, the Internet, based on the functionality paid for by the user. Similarly, the microcode controlling a digital signal processor, such as that in a modem or a Bluetooth-capable Palm Pilot, could be upgraded to add entirely new functions and features, for example, faster new layer-1 framing protocols, new encryption algorithms, a new user interface, a new operating system version, etc.

The present invention may also be applicable to other types of upgrades including performance enhancements or upgrades to accommodate new parameters not available at the time of distribution of the product. For example, a washing machine that senses what types of clothing are in the load and adjusts its wash cycle accordingly could be upgraded when new fabric types are manufactured, a power tool that receives new instructions on how to cut patterns, or a solar powered lawn mower acquiring new functionality as a result of a firmware update. In the latter example, new ephemeris tables could be loaded into a solar-powered lawn mower based on the lawn mower's new geographical location sensed by a GPS module and the season, enabling adjustment of the solar panel angle for optimum power.

Other examples of applications of the present invention may include the automotive field. A basic automobile with programmable features could be shipped to the dealer. The customer orders the automobile and selects certain extra features, such as a different engine controller for higher performance, a higher-quality radio, climate control, automatic seat adjustment, keyless entry, and cellular phone. The dealership orders the features from the manufacturer digitally, receives the keys which are keyed to the specific automobile's make and serial number, pays for the features, and installs them to the automobile using wireless (or wired) transmission of the new firmware. Such a system may reduce the cost to manufacture or install custom features in an automobile, and, also, may prevent theft by the customer and by the dealer from the manufacturer, as only features that have been paid for can be installed, and only on one particular automobile. As will be appreciated by those of skill in the art in light of the present disclosure, new methods of doing business by altering the supply chain between the manufacturer and the consumer and providing a means for dynamically and securely updating device functionality may be provided in embodiments of the present invention.

Thus, as described above, embodiments of the present invention which may provide secure updates of programmable memories may be applicable to a wide array of devices and may even provide new paradigms for the distribution of goods and services. Such a paradigm may be advanced because the secure and customizable selective applications of firmware updates may provide for differing levels of functionality on hierarchical levels from global updates to specific device updates. A manufacturer or service provider may control the functionality of devices utilizing embodiments of the present invention with a possible reduced exposure to theft by either malicious third parties or by unauthorized customers or even parties in the distribution chain.

The flowcharts and block diagrams of FIGS. 1 through 11 illustrate the architecture, functionality, and operation of possible implementations providing secure firmware updates according to the present invention. In this regard, each block in the flow charts or block diagrams represents a module, segment, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

In the drawings and specification, there have been disclosed typical preferred embodiments of the invention and, although specific terms are employed, they are used in a generic and descriptive sense only and not for purposes of limitation, the scope of the invention being set forth in the following claims.

That which is claimed:

1. A method of controlling updates of a programmable memory of a device, the method comprising:
   providing an update window of predefined duration during which the programmable memory may be updated; and
   allowing updates of the programmable memory only during the update window;
   wherein the steps of providing an update window and allowing updates comprise the steps of:

allowing access to the programmable memory based on the state of an access latch;

setting the access latch to allow access to the programmable memory after a hardware reset of the device;

executing an update control program to control access to the programmable memory;

resetting the latch to prevent access to the programmable memory upon completion of the update control program;

allowing access to a memory where the update control program resides when the access latch allows access to the programmable memory; and preventing access to the memory where the update control program resides when the access latch prevents access to the programmable memory.

2. A method according to claim 1, wherein the update control program further carries out the steps of:

determining if an update of the programmable memory is, available; and updating the programmable memory if an update of the programmable memory is available.

3. A method according to claim 2, wherein the step of determining if an update of the programmable memory is available comprises examining at least one of a local memory location, a local drive, a network drive and an input device status to determine if an update is available.

4. A method according to claim 2, wherein the step of determining if an update of the programmable memory is available comprises examining persistent status information.

5. A method according to claim 2, wherein the step of updating the programmable memory comprises the steps of:

obtaining an update image associated with the available update containing update data to be written to the programmable memory;

obtaining installation information from the update image; and writing the update data to the programmable memory based on the installation information obtained from the update image.

6. A method according to claim 5, wherein the installation information comprises an install program and wherein the step of writing the update data to the programmable memory based on the installation information obtained from the update image comprises executing the install program to write the update data to the programmable memory.

7. A method according to claim 2, wherein the step of updating the programmable memory comprises the steps of:

loading an update image associated with the available update into a temporary workspace; and updating the programmable memory from the loaded update image.

8. A method according to claim 2, further comprising the step of storing existing data from the programmable memory so as to provide a backup copy of the existing data from the programmable memory.

9. A method according to claim 8, further comprising the steps of:

determining if the update of the programmable memory was successful; and restoring the contents of the programmable memory from the backup copy if the update of the programmable memory was not successful.

10. A method according to claim 2, wherein the update control program further carries out the step of:

verifying the authenticity of the update of the programmable memory if an update of the programmable memory is available.

11. A method according to claim 10, wherein the step or verifying the authenticity of the update comprises the step of determining if a valid digital signature is provided with the image by decrypting the digital signature provided with the image using a shared secret.

12. A method according to claim 10, wherein the step of verifying the authenticity of the update comprises the step of:

evaluating at least one certificate in an update image associated with the available update to determine if a valid digital signature is provided with the update image.

13. A method according to claim 12, wherein the step of evaluating at least one certificate comprises the steps of:

decrypting a digital signature of the certificate utilizing a public key of a certificate authority accessible to the update program: and comparing the decrypted digital signature with a precomputed value to determine if the digital signature is a valid digital signature associated with the certificate authority.

14. A method according to claim 13, wherein the public key is stored in a non-updateable memory associated with the update control program.

15. A method according to claim 13, further comprising the step of:

providing the public key of the certificate authority in a previous version of data to be stored in the programmable memory; and wherein the step of decrypting a digital signature of the certificate utilizing a public key further comprises the step of obtaining the public key from the programmable memory.

16. A method according to claim 10, wherein the update includes a plurality of certificates in a hierarchy of certificates and wherein the step of verifying the authenticity of the update comprises the step of evaluating certificates of the plurality of certificates in an update image to determine if a valid digital signature is provided with certificates of the plurality of certificates in the update image.

17. A method according to claim 16, wherein the step of evaluating certificates of the plurality of certificates comprises the steps of decrypting a digital signature of a certificate utilizing a public key associated with a next-higher certificate in the hierarchy;

comparing the decrypted digital signature with a precomputed value to determine if the digital signature is a valid digital signature associated with the certificate;

obtaining a public key associated with another of the digital certificates;

repeating the steps of decrypting and comparing utilizing the obtained public key associated with another of the digital certificates; and wherein the step of obtaining a public key is repeated until a public key associated with a last of the digital certificates is obtained, and comparing the last public key with a predetermined value.

18. A method according to claim 10, further comprising the steps of:

obtaining application rules information from an extension of at least one certificate associated with the update;

evaluating the rules information obtained from the at least one certificate; and wherein the step of updating the programmable memory comprises the step of selectively updating the programmable memory based on the evaluation of the rules information obtained from the at least one certificate.

19. A method according to claim 18, wherein the step of evaluating the rules information comprises the step of evaluating at least one of rules information associated with a manufacturer of the device, rules information associated with a brand of the device, rules information associated with a software version of the device, rules information associated with a license authorization of the device or rules information associated with the individual device.

20. A system for controlling updates of a programmable memory of a device, comprising:
means for providing an update window of predefined duration during which the programmable memory may be updated; and
means for allowing updates of the programmable memory only during the update window;
wherein the means for providing an update window and the means for allowing updates, comprise:
means for allowing access to the programmable memory based on the state of an access latch;
means for setting the access latch to allow access to the programmable memory after a hardware reset of the device;
means for executing an update control program to control access to the programmable memory;
means for resetting the latch to prevent access to the programmable memory upon completion of the update control program;
means for allowing access to a memory where the update control program resides when the access latch allows access to the programmable memory; and
means for preventing access to the memory where the update control program resides when the access latch prevents access to the programmable memory.

21. A system according to claim 20, further comprising:
means for determining if an update of the programmable memory is available; and
means for updating the programmable memory if an update of the programmable memory is available.

22. A system according to claim 21, wherein the means for determining if an update of the programmable memory is available comprises means for examining at least one of a local memory location, a local drive, a network drive and an input device status to determine if an update is available.

23. A system according to claim 21, wherein the means for determining if an update of the programmable memory is available comprises means for examining persistent status information.

24. A system according to claim 21, wherein the means for updating the programmable memory comprises:
means for obtaining an update image associated with the available update containing update data to be written to the programmable memory;
means for obtaining installation information from the update image; and
means for writing the update data to the programmable memory based on the installation information obtained from the update image.

25. A system according to claim 24, wherein the installation information comprises an install program and wherein the means for writing the update data to the programmable memory based on the installation information obtained from the update image comprises means for executing the install program to write the update data to the programmable memory.

26. A system according to claim 20, wherein the means for updating the programmable memory comprises:
means for loading an update image associated with the available update into a temporary workspace; and
means for updating the programmable memory from the loaded update image.

27. A system according to claim 20, further comprising means for storing existing data from the programmable memory so as to provide a backup copy of the existing data from the programmable memory.

28. A system according to claim 27, further comprising:
means for determining if the update of the programmable memory was successful; and
means for restoring the contents of the programmable memory from the backup copy if the update of the programmable memory was not successful.

29. A system according to claim 20, further comprising means for verifying the authenticity of the update of the programmable memory if an update of the programmable memory is available.

30. A system according to claim 29, wherein the means for verifying the authenticity of the update comprises means for evaluating at least one certificate in update image associated with the available update to determine if a valid digital signature is provided with the update image.

31. A system according to claim 30, wherein the means for evaluating at least one certificate comprises:
means for decrypting a digital signature of the certificate utilizing a public key of a certificate authority accessible to the update program; and
means for comparing the decrypted digital signature with a precomputed value to determine if the digital signature is a valid digital signature associated with the certificate authority.

32. A system according to claim 31, wherein the public key is stored in a non-updateable memory associated with the update control program.

33. A system according to claim 31, further comprising:
means for providing the public key of the certificate authority in a previous version of data to be stored in the programmable memory; and
wherein means for decrypting a digital signature of the certificate utilizing a public key further comprises means for obtaining the public key from the programmable memory.

34. A system according to claim 30, further comprising:
means for obtaining application rules information from an extension of at least one certificate associated with the update;
means for evaluating the rules information obtained from the at least one certificate; and
wherein the means for updating the programmable memory comprises means for selectively updating the programmable memory based on the evaluation of the rules information obtained from the at least one certificate.

35. A system according to claim 34, wherein the means for evaluating the rules information comprises means for evaluating at least one of rules information associated with a manufacturer of the device, rules information associated with a brand of the device, rules information associated with a software version of the device, rules information associated with a license authorization of the device or rules information associated with the individual device.

36. A system according to claim 29, wherein the means for verifying the authenticity of the update image comprises means for determining if a valid digital signature is provided with the image by decrypting the digital signature provided with the image using a shared secret.

* * * * *